US006625153B1

(12) United States Patent
Liu

(10) Patent No.: US 6,625,153 B1
(45) Date of Patent: Sep. 23, 2003

(54) DISTRIBUTED CELLULAR COMMUNICATION SYSTEM ARCHITECTURE FOR THE CO-EXISTENCE OF MULTIPLE TECHNOLOGIES

(75) Inventor: Chung Zin Liu, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/392,369

(22) Filed: Sep. 8, 1999

(51) Int. Cl.[7] .............................................. H04L 12/28
(52) U.S. Cl. ..................... 370/395; 370/467; 370/310.2; 370/401; 455/422
(58) Field of Search ........................ 370/395.1, 395.31, 370/395.5, 395.52, 401, 419, 463, 464, 465, 466, 310, 310.1, 310.2, 328, 329, 342, 352–357, 395.51, 410, 469, 236; 455/403, 422, 426

(56) References Cited

U.S. PATENT DOCUMENTS

| | | | | |
|---|---|---|---|---|
| 5,987,008 A | * | 11/1999 | Simpson et al. | ............ 370/236 |
| 6,034,950 A | * | 3/2000 | Sauer et al. | ............. 370/310.2 |
| 6,111,673 A | * | 8/2000 | Chang et al. | ................ 359/123 |
| 6,167,051 A | * | 12/2000 | Nagami et al. | ............. 370/397 |
| 6,178,169 B1 | * | 1/2001 | Hodgkinson et al. | .. 370/395.52 |
| 6,285,877 B1 | * | 9/2001 | Liu et al. | .................... 455/426 |

* cited by examiner

Primary Examiner—Douglas Olms
Assistant Examiner—Brian Nguyen

(57) ABSTRACT

The distributed cellular communication system architecture for the co-existence of multiple technologies uses the mapping table capability of the Asynchronous Transfer Mode network and the multi-layer nature of the signaling protocol that is used in cellular communication networks to transparently interconnect cellular communication network elements that use different technologies and/or signaling protocols. The present distributed cellular communication system architecture avoids the need for significant changes in the cellular call processing software to accommodate new cellular communication network components by inserting signal routing data into the Asynchronous Transfer Mode network routing tables to thereby interconnect signals between compatible endpoints that are connected to the Asynchronous Transfer Mode network. The layer 1 and layer 2 protocols of the Asynchronous Transfer Mode network are used as the conduit that carries the signals between endpoints and are the same for all technologies and signaling protocols. The data contained in the upper layers of the multi-layer protocol are technology and signaling protocol specific, but are not interpreted by the Asynchronous Transfer Mode network, they are simply routed to a designated endpoint pursuant to the data entries in the routing tables of the Asynchronous Transfer Mode network.

14 Claims, 4 Drawing Sheets

| CALL INSTANCES | | | |
|---|---|---|---|
| | XXX | 311 | XXX |
| DATA | | B-ISDN | |
| VOICE | | PSTN | |
| INTERNET | | INTERNET | |

DISTRIBUTED CELLULAR COMMUNICATION SYSTEM ARCHITECTURE FOR THE CO-EXISTENCE OF MULTIPLE TECHNOLOGIES

CROSS-REFERENCE TO RELATED APPLICATIONS

This application is related to U.S. patent application Ser. No. 09/123,179, filed on Jul. 27, 1998, now U.S. Pat. No. 6,285,877 titled "Cellular Call Processor Having Concurrent Instances of Call Models to Support Mixed Media Communication Connections".

FIELD OF THE INVENTION

This invention relates to cellular communication systems and, in particular, to a distributed cellular communication system architecture that supports the co-existence of multiple technologies in the various system components for the control and processing of cellular communication connections.

PROBLEM

The problem with existing cellular communication networks is that they are technology specific and the introduction of new technologies in a cellular communication network results in major changes in the cellular call processing software to accommodate the new cellular communication network components. The introduction of new technologies in cellular communication networks is therefore impeded by this limitation, since the transition to a new technology in even a single cellular communication network element represents a costly investment in changes necessitated in the remaining segments of the cellular communication network to be compatible with the newly added cellular communication network component.

In addition to technology differences, there are also differences in the standards that are used to implement the signaling protocol and signal interfaces between cellular communication network elements. Within the United States, Common Channel Signaling systems use the ANSI Signaling System No. 7 (SS7) protocol while outside of the United States the International Signaling System No. 7 (ITU-7) protocol is used. Thus, there is an incompatibility in the signaling protocols and interfaces presented by a cellular communication network component if the component is designed to conform to a standard that differs from the standard used to implement the remainder of the cellular communication network.

SOLUTION

The above described problems are solved and a technical advance achieved by the present distributed cellular communication system architecture for the co-existence of multiple technologies, which uses the mapping table capability of the Asynchronous Transfer Mode network and the multi-layer nature of the signaling protocol that is used in cellular communication networks to transparently interconnect cellular communication network elements that use different technologies and/or signaling protocols. The Asynchronous Transfer Mode network and the multi-layer signaling protocol are used to interconnect the various signal processing elements that comprises the cellular communication network, including the following elements: Mobile Switching Center (MSC), Selection/Distribution Unit (SDU), a plurality of base stations, a circuit switched communication network, and a packet switched communication network. This collection of elements is used to implement the control and processing of cellular communication connections.

The present distributed cellular communication system architecture avoids the need for significant changes in the cellular call processing software to accommodate new cellular communication network components by inserting signal routing data into the Asynchronous Transfer Mode network routing tables to thereby interconnect signals between compatible endpoints that are connected to the Asynchronous Transfer Mode network. The layer 1 and layer 2 protocols of the Asynchronous Transfer Mode network are used as the conduit that carries the signals between endpoints and are the same for all technologies and signaling protocols. The data contained in the upper layers of the multi-layer protocol are technology and signaling protocol specific, but are not interpreted by the Asynchronous Transfer Mode network, they are simply routed to a designated endpoint pursuant to the data entries in the routing tables of the Asynchronous Transfer Mode network.

Therefore, different technologies and/or different signaling protocol and signal interfaces between cellular communication network elements can be implemented in the cellular communication system without the need to update all of the call processing software components.

DETAILED DESCRIPTION

The distributed cellular communication system architecture for the co-existence of multiple technologies uses the mapping table capability of the Asynchronous Transfer Mode network and the multi-layer nature of the signaling protocol that is used in cellular communication networks to transparently interconnect cellular communication network elements that use different technologies and/or signaling protocols. The present distributed cellular communication system architecture avoids the need for significant changes in the cellular call processing software to accommodate new cellular communication network components by inserting signal routing data into the Asynchronous Transfer Mode network routing tables to thereby interconnect signals between compatible endpoints that are connected to the Asynchronous Transfer Mode network. The layer 1 and layer 2 protocols of the Asynchronous Transfer Mode network are used as the conduit that carries the signals between endpoints and are the same for all technologies and signaling protocols. The data contained in the upper layers of the multi-layer protocol are technology and signaling protocol specific, but are not interpreted by the Asynchronous Transfer Mode network, they are simply routed to a designated endpoint pursuant to the data entries in the routing tables of the Asynchronous Transfer Mode network.

Cellular Communication Network Architecture

Figure 1:
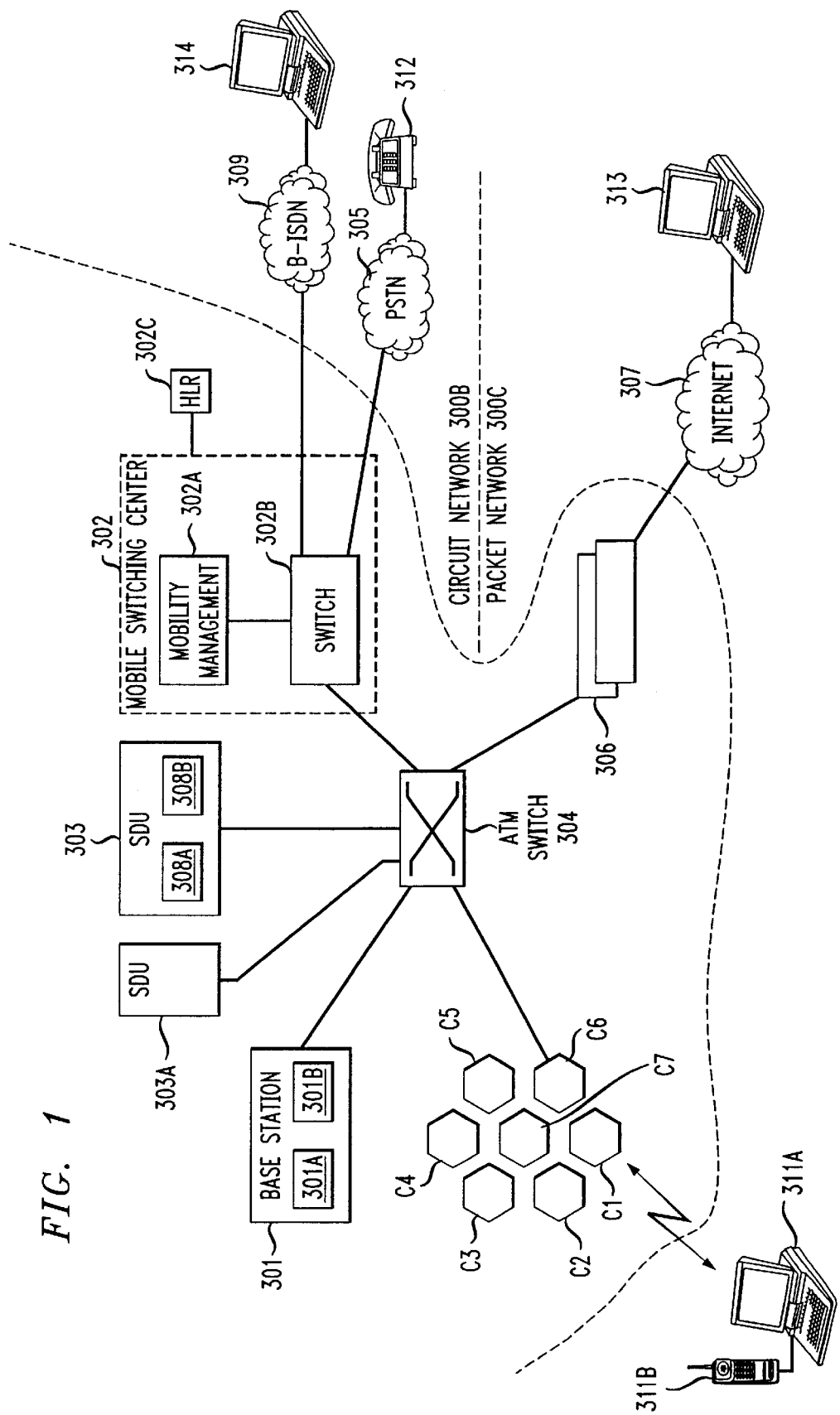
FIG. 1 illustrates in block diagram form the overall network architecture of a cellular communication system that incorporates the present distributed cellular communication system architecture.

FIG. 1 illustrates in block diagram form the overall network architecture of a cellular communication system (using CDMA technology as but one example of the present system concept) that incorporates the present distributed cellular communication system architecture. The cellular communication system 300A is connected to both a circuit network 300B and a packet network 300C to thereby interconnect subscribers that are served by this collection of networks. The cellular communication system 300A comprises a number of components that serve to locate, identify and provide communication services for a plurality of mobile subscriber stations (such as mobile subscriber station 311) that are operational in the radio coverage area of the cellular communication system 300A. In particular, a Mobile Switching Center (MSC) 302 serves at least one and more typically a plurality of base stations 301. Each base station 301 is interconnected with a plurality of cell sites C1–C7 that are equipped with the wireless transmitters and receivers that provide the wireless communication links to the mobile subscriber stations, such as mobile subscriber station 311, that are operational in the radio coverage area of the cell site C1. A Selection/Distribution Unit (SDU) 303 is provided to manage the frame selection and multiplexing functions of the radio channel allocation in the cell sites C1–C7 and implement the call direction function. Finally, the data interworking function 306 functions as an interface between the cellular communication system 300A and a data transport network, such as Internet 307. The collection of elements used to implement the cellular communication system 300A illustrated in FIG. 1 can be implemented as separate units, interconnected via a data communication switching element, such as Asynchronous Transfer Mode switching system 304, or can be combined into a lesser number of components.

In this cellular communication system, the Selection/Distribution Unit 303 is the entity that communicates with the Mobile Switching Center 302 via the industry standard IS-634 A1 signaling messages. In order to account for differing technologies and/or differing signaling protocols, multiple Selection/Distribution Units, such as 303 and 303A, can be provided, with one being implemented for each technology and/or differing signaling protocol, or one Selection/Distribution Unit can be provided that routes the signals through the Asynchronous Transfer Mode switching system 304 to designated endpoints using customized interfaces 308A, 308B to match the protocol of the end serving network. Base station 301 is the origination and termination point for all air interface signaling (layer 3) messages and is also the entity responsible for providing the air interface with the mobile subscriber stations 311. The base station 301 comprises two components: radio control component 301A and channel management component 301B. The processing of call originations and call terminations between the mobile subscriber stations 311 and the cellular communication system 300A are well known in concept and defined by signaling standards that are promulgated by various industry standards organizations. The specific details of such call and signal processing are disclosed herein only to the extent necessary to understand the concepts of the present cellular call processor.

Multi-Layer Signaling Protocol

Figures 2, 5:
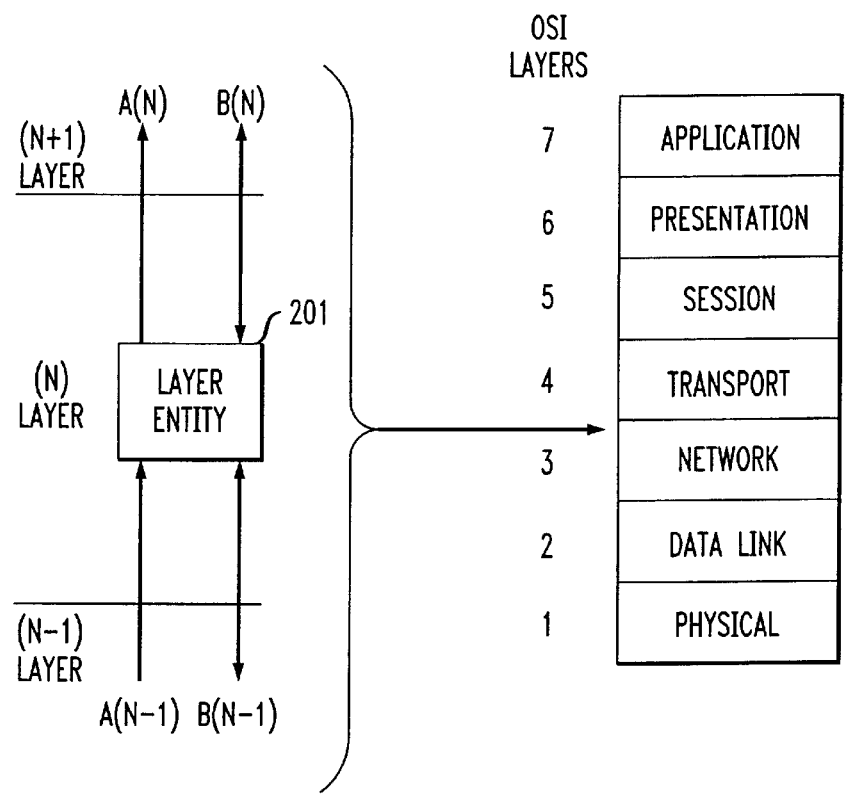
FIG. 2 illustrates in block diagram form the basic concept of layers and primitives that are used in a typical Common Channel Signaling (CCS) system.
FIG. 5 illustrates an example of a routing table for use in the cellular communication system that incorporates the present distributed cellular communication system architecture.

FIG. 2 illustrates in block diagram form the basic concept of layers and primitives that are used in a typical Common Channel Signaling (CCS) system. The Common Channel Signaling (CCS) system in the Public Telephone Switched Network (PTSN) serves to interconnect application services implemented in layers 3–7 of the OSI layers and transfer services implemented in layers 1–2 of the OSI layers. The application services and transfer services are implemented in either the ANSI Signaling System No. 7 (SS7) paradigm or the International Signaling System No. 7 (ITU-7) paradigm.

The OSI model is used in Common Channel Signaling (CCS) systems and identifies the protocol that is implemented at each layer. The protocol model calls for seven separate and independent layers of protocol for communication. Each layer provides its own specific functionality. Additionally, each layer provides services to the next layer above and below via standard interfaces as shown in block diagram form in FIG. 2. This layered protocol allows building up complex transactions on successively simpler lower layers and achieving layer independence and flexibility. In particular, at any layer of the OSI model (such as layer N), a layer entity 201 can communicate with another entity 202 that is implemented in the same layer (N) of the OSI model via a peer-to-peer protocol. However, the layer entity 201 forwards services via path A(N) in a unidirectional manner to a layer entity 203 located in the next successively superior layer (N+1). Similarly, the layer entity 201 receives services via path A(N−1) in a unidirectional manner from a layer entity 204 located in the next successively inferior layer (N−1). Therefore, the services pass in a unidirectional manner up the layers of the OSI model to ever increasing superior levels. There is additional communications that take place between adjacent layers of the OSI model, and these are implemented via paths B(N), B(N−1) wherein primitives exchange parameters between successive layers of the OSI model. The interfaces between the functional layered elements of CCS7 are specified using these interface primitives. The primitives consist of commands and their respective responses associated with the services requested. The layered protocol provides layer independence and flexibility.

Cellular Call Processing

Figure 3:
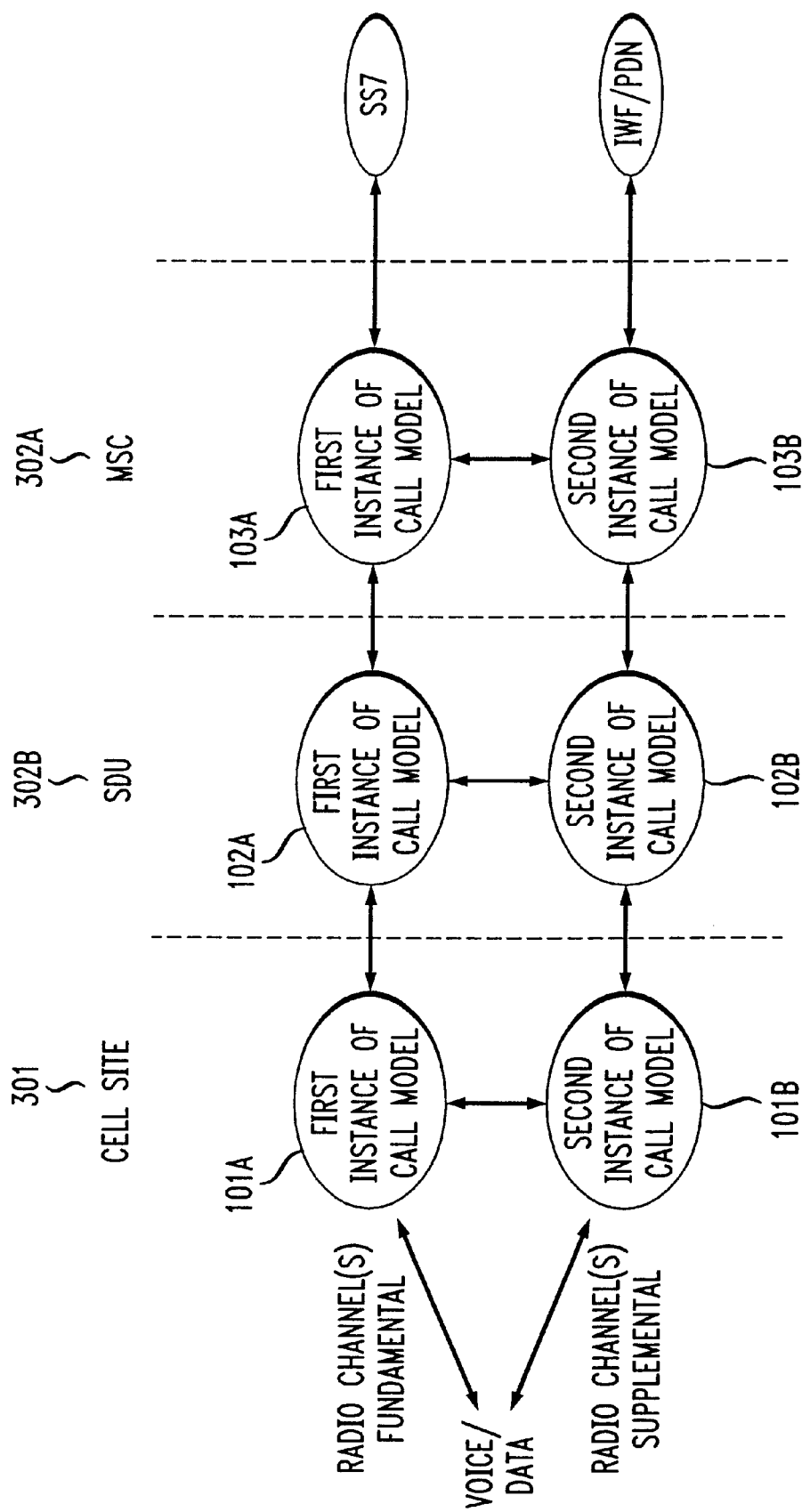
FIG. 3 illustrates in block diagram form the processor architecture of the cellular communication system that incorporates the present distributed cellular communication system architecture.

FIG. 3 illustrates in block diagram form the processor architecture of the cellular communication system that incorporates the present distributed cellular communication system architecture. In particular, the case where the cellular communication connection comprising a voice and data call is illustrated. The cellular call processor, in the sense used herein, comprises a number of cooperatively operative processes 101–103 that are located in the various components of the cellular communication system 300A described above. The cellular call processor can be implemented in various ways, and the particular implementation disclosed herein is selected to be illustrative of the concept of the invention and is not intended to limit the applicability of the concept to other implementations that represent variations of this concept.

The cellular call processor comprises processes 101–103 that execute in the various components 301, 302 of the cellular communication system 300A illustrated in FIG. 1. The most pertinent ones of these processes comprise the call model 101 extant in the base station 301 and implemented in radio control component 301A; the call model 102 extant in the switch control process 302B in the mobile switching center 302; and the call model 103 extant in the mobility management process 302A in the mobile switching center 302. Each of these processes 101–103 is an existing cellular communication processes found in cellular communication systems. The present cellular call processor replicates these processes by creating multiple instances of the processes to thereby process each call component independently, yet have the multiple call components of a communication connection cooperatively processed.

The typical cellular call instance is where a mobile subscriber at a mobile subscriber station 311 initiates a voice cellular call in the traditional manner. The cellular call processor initiates a first instance 101A–103A of each of the call models 101–103 that are used to establish the cellular communication connection. The first instance 101A–103A of each call model uses the standard call model, since the call that was originated was a voice call. The call appearance is also given a reference ID that comprises an identification indicia that is associated with this call appearance. The reference ID is maintained in the mobile switching center 302, but is also stored in the mobile subscriber station 311.

During the establishment of this call, or after the basic voice call is established, the mobile subscriber activates mixed media communication service. This mixed media communication service can be any combination of the types of media (loosely termed data)communications and/or voice communications, including, but not limited to: E-Mail upload, WEB surfing, file transfers, analog or digital fax, packet telephone, graphics, video, additional voice calls, and the like. The mobile subscriber station 311 can direct the mixed media communications to a single destination 307 where the various data connections are managed independent of the cellular communication network 300A or the subscriber can individually route the mixed media communication components to different destinations 312, 314. For example, the graphics and voice components can be received from a mixed media conference system with the subscriber at station 312 using data termnial device 314, while there is also a concurrently active data file transfer operation underway via Internet 307 that is independent of the mixed media conference. Furthermore, E-Mail transfers can be executing as a background process on the Internet connection. Thus, the mobile subscriber can manage what is presently viewed as multiple communication connections in a single cellular communication session. The management of these multiple call components is effected by the use of multiple instances of call models and the use of multiple SDUs 303, 303A or multiple interfaces 308A, 308B located in a single SDU 303. For example, in the case where the subscriber at mobile subscriber station 311 requests a data communication connection to Internet 307, the reference ID for this call appearance is used to activate a second instance of the call models 101B–103B to thereby process the data call component of this call connection. The second instance of the call models 101B–103B can be identical to the first instance of the call models 101A–103A, or they can be customized versions of the first instance of the call models 101A–103A to specifically process data calls.

Each of these instances writes data into the call routing table 500 of FIG. 5 located in Asynchronous Transfer Mode switching system 304 to indicate the destination of this transmission. Thus, the data entered into the routing table 500 indicates to the Asynchronous Transfer Mode switching system 304 that the data transmissions which correspond to the voice communication connection and associated signaling must be routed to Public Switched Telephone Network (PSTN) 305 located in the circuit network 300B to extend the call connection to the identified destination, telephone station set 312. The control signalling received from base station 301 is routed to interface 308A located in SDU 303 since this is a voice communication connection for the Public Switched Telephone Network (PSTN) 305 located in the circuit network 300B. The data entered into the routing table also indicates to the Asynchronous Transfer Mode switching system 304 that the data transmissions which correspond to the data communication connection and associated signaling for data terminal device 314 must be routed to B-ISDN network 309 located in the circuit network 300B. The control signalling received from base station 301 is routed to interface 308B located in SDU 303 since this is a data communication connection for the B-ISDN network 309 located in the circuit network 300B. Similarly, the data entered into the routing table indicates to the Asynchronous Transfer Mode switching system 304 that the data transmissions which correspond to the Internet data communication connection and associated signaling must be routed to Internet 307 located in the packet network 300C. Thus, where a plurality of systems are provided to implement the circuit network 300B, then the routing table 500 can indicate the one of these systems: B-ISDN network 309 or Public Switched Telephone Network (PSTN) 305, that correspond in technology and signaling protocol to the present data transmissions.

Figure 4:
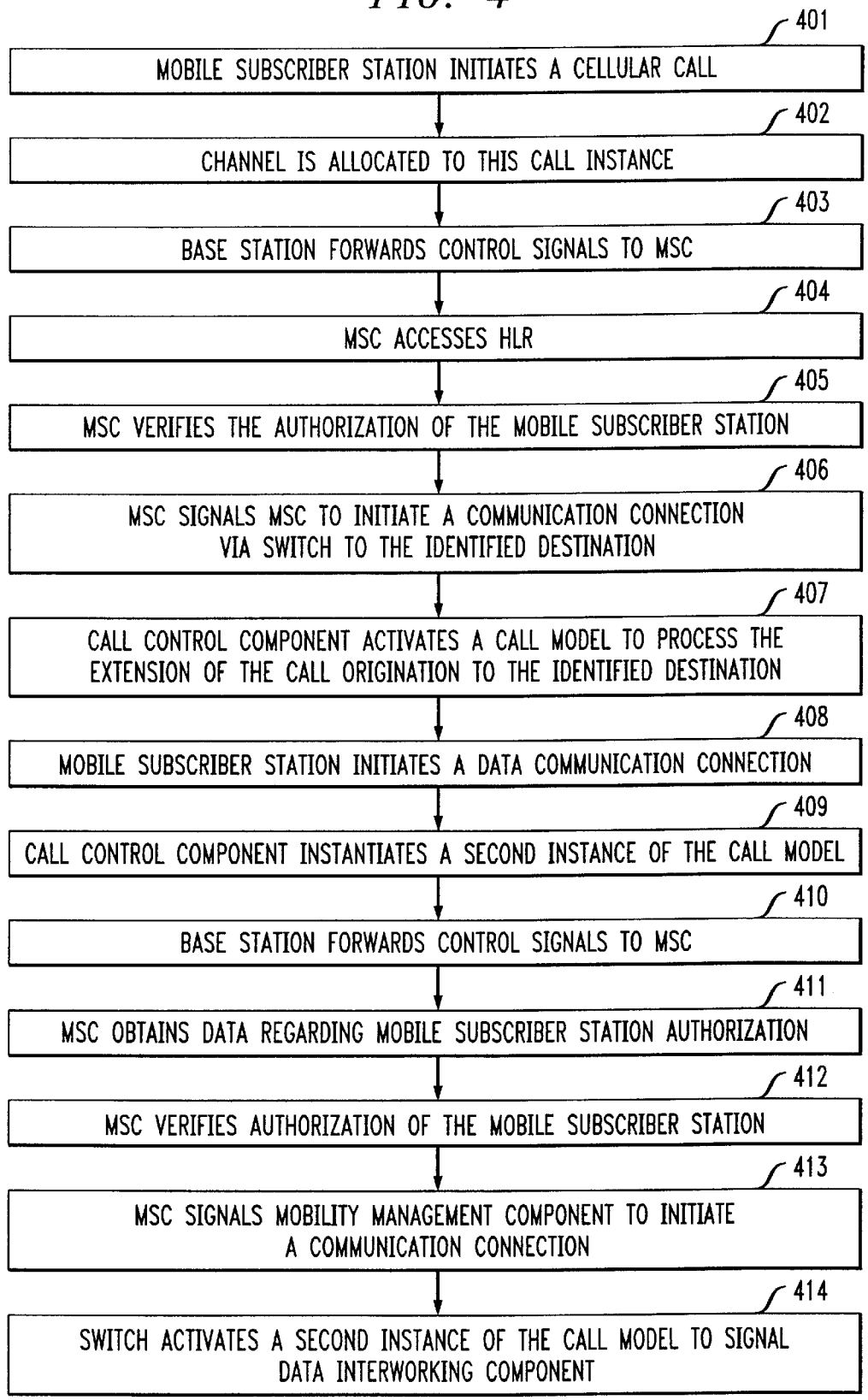
FIG. 4 illustrates in flow diagram form the operation of the cellular communication system that incorporates the present distributed cellular communication system architecture.

FIG. 4 illustrates in flow diagram form the operation of the cellular communication system that incorporates the present distributed cellular communication system architecture. At step 401, the mobile subscriber at mobile subscriber station 311 initiates a voice cellular call in a well known fashion. The mobile subscriber station 311 initiates radio communication with the base station 301 via one or more of the serving cell sites C1. At step 402, a fundamental radio channel in the radio communication space is allocated to this call instance and, in the case of CDMA communications, a predefined code is allocated for this communication connection. The base station 301 comprises two components: radio control component 301A and channel management component 301B. The channel management component 301B manages the assignment of radio communication channels to mobile subscriber station 311 and the maintenance of these communication channels as the mobile subscriber station 311 moves among the cell sites C1–C7. Therefore, the call model 101A in the radio control component 301A allocates the resources necessary to implement the communication connection at step 402. The call model 101A defines the originating party, subscriber locator encoder, the CDMA code for the communication channel, and the radio link protocol. At step 403, the base station 301 forwards control signals to the mobile switching center 302 indicative of the call origination that was initiated by mobile subscriber station 311.

The mobile switching center 302 determines the authorization of the mobile subscriber station to obtain the requested service at step 404 by accessing the Home Location Register (HLR) 302C in the mobile switching center 302. The nature of the media requested by the call can also be determined by use of the home location register 302C. In particular, the subscriber provision number that is stored in the home location register 302C can be used to define the modes of communication that are available for the mobile subscriber. The subscriber provision number can define the call as voice only, voice/data, data only, or any type of mixed media. In addition, the subscriber provision number can be used to identify the mode of originating and receiving these call components, such as automatic extension of service on an incoming call component within the set of authorized types of call components. At step 405, the mobile switching center 302 verifies the authorization of the mobile subscriber station 311 to receive the requested service and at step 406 activates the call control component 302A to initiate a communication connection via switch 302B to the identified destination, subscriber 312. This communication connection is effected at step 407 by mobility management component 302A activating a first instance of call model 102A to process the extension of the call origination to the identified destination. In addition, switch 302B activates a first instance of call model 103A to originate the communication connection and associated signaling to Public Switched Telephone Network (PSTN) 305 to extend the call connection to the identified destination, telephone station set 312.

In the case where the mobile subscriber at mobile subscriber station 311 additionally initiates a data communication connection, of one or more of the types noted above, at step 408, the call control component 301A at step 409 instantiates a second instance of the call model 101B (call processing process) to process this newly received request. The second instance of the call model 101B can be either identical to the first (voice) instance of call model 101A, or can be customized to correspond to the nature of the media destined to be transmitted over the newly allocated channel. For instance, one way to process a data call is to allocate supplemental radio channel(s) on demand. In either case, the call processing for the second instance of the call model 101B proceeds as described above with respect to the first instance of call model 101A in terms of operation of the base station 301 and the mobile switching center 302. In particular, the base station 301 at step 410 forwards control signals to the mobile switching center 302 indicative of the call origination that was initiated by mobile subscriber station 311. The mobile switching center 302 obtains data regarding the authorizations of the mobile subscriber station 311 at step 411 and at step 412 the mobile switching center 302 verifies the authorization of the mobile subscriber station 311 to receive the requested service and at step 413 activates the mobility management component 302A to initiate a communication connection via switch 302B. This communication connection is effected at step 414 by switch 302B activating a second instance 102B of the call model 102A that was used to implement the original voice communication connection to the subscriber at telephone station set 312. Additionally, the mobility management component 302A initiates a second instance 103B of the call model 103A that was used to implement the original voice communication connection to the subscriber at telephone station set 312. These second instances of the call models signal data interworking component 306 via the ATM switch 304 to extend the call connection to the identified destination, terminal device 313 via a data transport network, such as Internet 307. Thus, the two call components can be directed to different destinations.

In the case where the multiple call components are directed to a single destination, the issue of later arriving call components is addressed via the use of the reference ID of the originating subscriber. The reference ID is the identification associated with a call appearance and is maintained by the mobile switching center 302, but this data is also stored in the mobile subscriber unit independent of the call model instance. When a communication connection is established through the cellular communication system 300A, the reference ID of the originating subscriber is forwarded along with the call origination control messages. The mobile number is the key identified in mobile systems and the associated call identification data defines the type of service. Thus, when a call component arrives at destination 312 after the original communication connection is established, the reference ID of the originating subscriber provides an indication that the presently arriving and the already established communication connections are associated and should be concurrently implemented.

SUMMARY

The mapping table capability of the Asynchronous Transfer Mode network and the multi-layer nature of the signaling protocol are used in cellular communication networks to transparently interconnect cellular communication network elements that use different technologies and/or signaling protocols. Therefore, different technologies and/or different signaling protocol and signal interfaces between cellular communication network elements can be implemented in the cellular communication system without the need to update all of the call processing software components.

What is claimed:

1. A distributed cellular communication system that functions to implement communications connections for a plurality of mobile subscriber stations that are extant in a service area covered by said distributed cellular communication system, wherein said distributed cellular communication system supports multiple technologies and signaling protocols to implement said communications connections for said plurality of mobile subscriber stations, comprising:
   - network means, having a plurality of ports, for transmitting signals between selected ones of said plurality of ports;
   - a plurality of base stations connected to said network means for extending cellular communications connections from said mobile subscriber stations that are extant in said service area to said network means;
   - at least one network managing means connected to said network means for managing said cellular communications connections;
   - at least one network interface means connected to said network means for interfacing said network means with at least one non-cellular switched communication network;
   - wherein said plurality of base stations, said at least one network managing means, and said at least one network interface means connected to said plurality of ports are implemented in at least two differing technologies and signaling protocols; and
   - means for selecting ones of said plurality of ports of said network means to interconnect ones of said plurality of base stations, said at least one network managing means, and said at least one network interface means of same technology and signaling protocols, comprising:
     - means for populating a routing table in said means for selecting with data indicating a correspondence between said at least one non-cellular switched communication network and said plurality of base stations as a function of said same technology and signaling protocols.

2. The cellular communication system of claim 1, wherein said at least one non-cellular switched communication network comprise at least two networks from the class of network topologies including: packet, circuit, Asynchronous Transfer Mode.

3. The cellular communication system of claim 2 wherein said at least one network interface means comprises:
   - at least one Mobile Switching Center means connected to said Asynchronous Transfer Mode network means for interfacing said network means with the at least one non-cellular switched communication network; and
   - at least one data interworking function means connected to said network means for interfacing said network means with at least one data communication network.

4. The cellular communication system of claim 1 wherein said at least one network managing means comprises:
   - a plurality of Selection/Distribution Unit means, each of which corresponds to one of said at least two differing technologies and signaling protocols.

5. The cellular communication system of claim 1 wherein said at least one network interface means comprises:
   - a plurality of Mobile Switching Center means, each of which corresponds to one of said at least two differing technologies and signaling protocols.

6. The cellular communication system of claim 1 wherein said network means comprises:
Asynchronous Transfer Mode network means, having a plurality of port, for transmitting signals between selected ones of said plurality of ports.

7. A method of operating a distributed cellular communication system that functions to implement communications connections for a plurality of mobile subscriber stations that are extant in a service area covered by said distributed cellular communication system, wherein said distributed cellular communication system supports multiple technologies and signaling protocols to implement said communications connections for said plurality of mobile subscriber stations, comprising the steps of:
transmitting, over a network having a plurality of ports, signals between selected ones of said plurality of ports;
extending, from selected ones of a plurality of base stations connected to said network, cellular communications connections from said mobile subscriber stations that are extant in said service area to said network;
managing, in at least one network manager connected to said network, said cellular communications connections;
interfacing, via at least one network interface connected to said network, said network with at least one non-cellular switched communication network; wherein said plurality of base stations, said at least one network manager, and said at least one network interface connected to said plurality of ports are implemented in at least two differing technologies and signaling protocols; and
selecting ones of said plurality of ports of said network to interconnect ones of said plurality of base stations, said at least one network manager, and said at least one network interface of compatible technology and signaling protocols, comprising:
populating a routing table that is generated in said step of selecting with data indicating a correspondence between said at least one non-cellular switched communication network and said plurality of base stations as a function of said compatible technology and signaling protocols.

8. The method of operating a cellular communication system of claim 7, wherein said at least one non-cellular switched communication network comprise at least two networks from the class of network topologies including: packet, circuit, Asynchronous Transfer Mode.

9. The method of operating a cellular communication system of claim 8 wherein said step of interfacing comprises:
operating at least one Mobile Switching Center which is connected to said network to interface said network with the at least one non-cellular switched communication network; and
operating at least one data interworking function which is connected to said network to interface said network with at least one data communication network.

10. The method of operating a cellular communication system of claim 7 wherein said step of managing comprises:
operating a plurality of Selection/Distribution Units, each of which corresponds to one of said at least two differing technologies and signal protocols.

11. The method of operating a cellular communication system of claim 7 wherein said step of interfacing comprises:
operating a plurality of Mobile Switching Centers, each of which corresponds to one of said at least two differing technologies and signaling protocols.

12. The method of operating a cellular communication system of claim 7 wherein said step of transmitting comprises:
operating an Asynchronous Transfer Mode network, having a plurality of ports, to transmit signals between selected ones of said plurality of ports.

13. A distributed cellular communication system that functions to implement communications connections for a plurality of mobile subscriber stations that are extant in a service area covered by said distributed cellular communication system, wherein said distributed cellular communication system supports multiple technologies and signaling protocols to implement said communications connections for said plurality of mobile subscriber stations, comprising:
Asynchronous Transfer Mode network means, having a plurality of ports, for transmitting signals between selected ones of said plurality of ports;
a plurality of cellular base stations connected to said Asynchronous Transfer Mode network means for extending cellular communications connections from said mobile subscriber stations that are extant in said service area to said Asynchronous Transfer Mode network means;
at least one Selection/Distribution Unit means connected to said Asynchronous Transfer Mode network means for managing said cellular communications connections;
at least one Mobile Switching Center means connected to said Asynchronous Transfer Mode network means for interfacing said Asynchronous Transfer Mode network means with at least one non-cellular switched communication network;
at least one data interworking function means connected to said Asynchronous Transfer Mode network means for interfacing said Asynchronous Transfer Mode network means with at least one data communication network;
wherein said plurality of base stations, said at least one Selection/Distribution Unit means, and said at least one Mobile Switching Center means connected to said plurality of ports are implemented in at least two differing technologies and signaling protocols; and
means for selecting ones of said plurality of ports of said Asynchronous Transfer Mode network means to interconnect ones of said plurality of base stations, said at least one Selection/Distribution Unit means, and said at least one Mobile Switching Center means of compatible technology and signaling protocols, comprising:
routing control means for populating a routing table in said Asynchronous Transfer Mode network means with data indicating a correspondence between said plurality of non-cellular switched communication networks and said plurality of base stations as a function of said compatible technology and signaling protocols.

14. The cellular communication system of claim 13, wherein said at least one non-cellular switched communication network comprise at least two networks from the class of network topologies including: packet, circuit, Asynchronous Transfer Mode.

* * * * *